(12) United States Patent
Brodskiy et al.

(10) Patent No.: US 10,080,425 B1
(45) Date of Patent: Sep. 25, 2018

(54) BELT-WEARABLE SUPPORT FOR HANDS-FREE USE OF HANDHELD ELECTRONIC DEVICES

(71) Applicants: Arkadiy Brodskiy, San Francisco, CA (US); Boris Brodsky, Thornhill (CA); Leon Brodskiy, Concord (CA)

(72) Inventors: Arkadiy Brodskiy, San Francisco, CA (US); Boris Brodsky, Thornhill (CA); Leon Brodskiy, Concord (CA)

( * ) Notice: Subject to any disclaimer, the term of this patent is extended or adjusted under 35 U.S.C. 154(b) by 0 days.

(21) Appl. No.: 15/810,502

(22) Filed: Nov. 13, 2017

(51) Int. Cl.
*H04B 1/3888* (2015.01)
*H04B 1/034* (2006.01)
*A45F 5/02* (2006.01)
*H04M 1/02* (2006.01)

(52) U.S. Cl.
CPC ............ *A45F 5/021* (2013.01); *H04B 1/3888* (2013.01); *H04M 1/0202* (2013.01)

(58) Field of Classification Search
CPC ...... H04B 1/388; H04B 1/0343; H04B 1/385; H04M 1/0202; H04M 2001/3855; A45F 5/021
See application file for complete search history.

(56) References Cited

U.S. PATENT DOCUMENTS

| | | | | |
|---|---|---|---|---|
| 9,179,762 B2 * | 11/2015 | Paugh | ...................... | A45F 5/004 |
| 9,405,172 B2 * | 8/2016 | Cunningham, III | ... | F16M 13/04 |
| 2013/0184033 A1 * | 7/2013 | Willenborg | ............. | H04M 1/04 455/557 |
| 2015/0195392 A1 * | 7/2015 | Nissenbaum | ........... | H04M 1/04 455/569.1 |
| 2015/0223590 A1 * | 8/2015 | Arias-Tabima | ......... | A45F 5/021 224/195 |
| 2015/0381786 A1 * | 12/2015 | Baig | ........................ | A45F 5/02 455/575.6 |
| 2017/0280862 A1 * | 10/2017 | Blackwood | ............... | A45F 5/00 |
| 2018/0116383 A1 * | 5/2018 | McGahey | ................. | A45F 5/00 |

FOREIGN PATENT DOCUMENTS

GB 2276658 * 5/1994

* cited by examiner

*Primary Examiner* — Andrew Wendell

(57) ABSTRACT

Proposed is a belt-wearable support for hands-free use of a handheld electronic device such as a smartphone. The support is made in the form of a case the back side of which is secured to a belt on the body of the user and the front side it tiltable forward due to bellows-like lateral sides. The interior space of the case is sufficient to contain a smartphone secured on the innermost member of the telescopically extendable mechanism formed by a group of C-shaped members slidingly fitted into each other. For positioning the smartphone at a required distance from the eyes of the user, which may view the information on the screen of the phone in a hands-free manner, the case is opened, the telescopic mechanism is extended to a required length, tilted to a required angle by an adjustable linkage mechanism, and is fixed in the selected position by a locking device.

9 Claims, 7 Drawing Sheets

BELT-WEARABLE SUPPORT FOR HANDS-FREE USE OF HANDHELD ELECTRONIC DEVICES

FIELD OF THE INVENTION

The present invention relates to a body-wearable support, which enables a user a hands-free use of handheld electronic devices displaying visual information, in particular such devices as smart phones, "phablets", small tablets, or similar devices. More specifically, the invention concerns a belt-wearable support that allows a user to view the screens of cell phones or small tablets in a hands-free manner and at a distance most convenient for clear viewing, while the user is in a sitting, standing, or walking position.

BACKGROUND OF THE INVENTION AND PRIOR ART DEVICES

Very often situations may occur when an individual finds himself (herself) in a sitting, standing, or walking position over a long time, and even if the individual's hands are free, it would be very tiring to keep a smartphone, small tablet, or a similar handheld electronic device in the user's hands at a certain distance from the user's yes, e.g., for reading, watching a movie, communicating via Skype (trademark of Skype Limited), etc. A situation is more aggravated when the user's hands are busy and he/she needs to hold, e.g., a smart phone, constantly in front of his/her eyes, e.g., for using a navigator when lost in a forest. There may be a desire to watch a movie when an individual is sitting in a train travelling for hours.

There exists a great variety of various smartphone mounts for cars. However, such devices are not convenient for attaching to the user's body and for supporting a handheld electronic device at a distance convenient for viewing.

Also known, heretofore, are body-wearable supports for hands-free use of handheld electronic devices. For example, US Patent Application Publication No. 20150195392 issued on Jul. 9, 2015 (inventor: I. Nissenbaum) discloses a harness-like wearable cell phone holder enabling stable, hands-free viewing of cell phone screen while the cell phone is supported on the viewer's torso and a method by which a cell phone is utilizable for computer functions. The wearable cell phone holder comprises a rigid flat base element to which a short stand element is attached such as by vacuum attachment. The stand element has an adjustably positioned clamp for holding the cell phone in a wearer viewable position. A lanyard is attached to a proximal side of the base element to support the clamped cell phone by the viewer's neck with the base element resting on the viewer's torso. An adjustable anchoring belt anchors the distal side of the base element against movement during viewing use of the cell phone.

U.S. Pat. No. 9,405,172 issued on Aug. 2, 2016 to F. Cunningham, III, et al. discloses a wearable mount for holding a portable electronic image capture device. The mount includes a base mount comprising an abutment portion configured securely attach the base mount, a cradle assembly attaching to the portable electronic image capture device, and a flexible arm connecting the base mount to the cradle assembly and permitting the user to adjust an orientation of the portable electronic image capture device. The wearable mount is designed to be worn by a user around the waist or slung across the chest, among other configurations. It is envisioned that attachment means for the wearable mount could allow the mount to be worn around the wrist, arm or leg, or slung from the neck. It is further envisioned that various attachment means could allow for other configurations. The design of the wearable mount allows user to position it at any level on the body, to the left or right side of the user, or even in front of or behind the user. The flexible arm is a flexible tubular body with a shape memory, which can be bent to a desired configuration and remain the configured shape and which has a rigidity sufficient to support a small item such as a smart phone.

A Chinese company (east-culture-2008) based in Shanghai is selling a flexible mobile phone holder in the form of a thin flexible shaft with shape memory which can be turned around a user's body (e.g., around the neck) and possesses sufficient rigidity in a deformed shape for holding a mobile phone. The distal end of the flexible shaft has a clip for holding the mobile phone.

SUMMARY

The invention provides a belt-wearable support for hands-Tree use of handheld electronic devices. The support consists of a case, e.g., a leather or molded-plastic case having on its back side a belt loop for securing the case on the body of a user with a conventional belt. The front side of the case is tiltable with respect to the back side, which is fixed with respect to the user's body by the belt. In order to make the front side tiltable, the lateral sides of the case are made expandable, e.g., in the form of bellows. The case contains a telescopically extendable mechanism formed by a plurality of C-shaped members telescopically inserted one into the other. The outermost C-shaped member is rigidly attached to the inner surface of the front side of the case, and other members can be telescopically extended from the case in the outward direction and fixed in the extended position with respect to each other, e.g., by snapping locks. Attached to the distant end of the innermost C-shaped member is a gripper for holding a handheld electronic device, e.g., a smartphone, in a position facing the user with the screen. The phone or another appropriate object, e.g., a small tablet, can be fixed in a gripper by resting on a flat shelf perpendicular to the plane of the flat part of innermost C-shaped member and clamped with spring-loaded edges of two laterally slidable grippers, which can be fixed by a locking screw-and-nut device in the object clamping position.

In order to arrange the extended members of the telescopically extendable mechanism in a titled position at an appropriate angle with respect to the body of the user, the belt-wearable support of the invention is provided with an adjustable linkage mechanism. The linkage mechanism is located inside the case and consists of one link pivotally attached to the inner surface of the back side of the case and another link pivotally attached to the inner surface of the front side of the case. The free ends of the links are connected to each other through an intermediate pivot. As a result, the tilt angle of the telescopic members can be changed by changing the angle between the both links. For fixing the telescopic members in a selected angular position, the intermediate pivot is provided with a locking device, e.g., a nut formed inside the intermediate pivot and a flanged-head bolt for tightening the pivotal links in the adjusted position.

The space inside the case is sufficient for holding the entire telescopically extendable mechanism in the folded state together with the handheld electronic device, e.g., a smart phone secured by the gripper.

For hands-free use of the belt-wearable support of the invention, the belt-wearable case is opened, the front side of the bag is tilted in the direction away from the user, and the telescopic extendable mechanism is extended outward from the case together with the electronic device, e.g., a smartphone, secured at the distal end of the innermost telescopic member.

A position of the electronic device, e.g., of a smartphone, most convenient for individual requirements of the user is selected by extending the innermost telescopic member to a required length and fixing the innermost member by an appropriate snapping lock, and then adjusting the angular position of the electronic device with respect to the body of the user by using the linkage mechanism with subsequent fixation of the adjusted angular position with the linkage locking device.

Now the belt-wearable support of the invention can be used without participation of the user's hands while the user is in a sitting, standing or waking position.

DETAILED DESCRIPTION OF THE INVENTION

The present invention relates to a body-wearable support, which enables a user a hands-free use of handheld electronic devices displaying visual information, in particular such devices as smart phones, "phablets", small tablets, or similar devices. More specifically, the invention concerns a belt-wearable support that allows a user to view the screens of cell phones or small tablets in a hands-free manner and at a distance most convenient for clear viewing, while the user is in a sitting, standing, or walking position.

Figure 1:
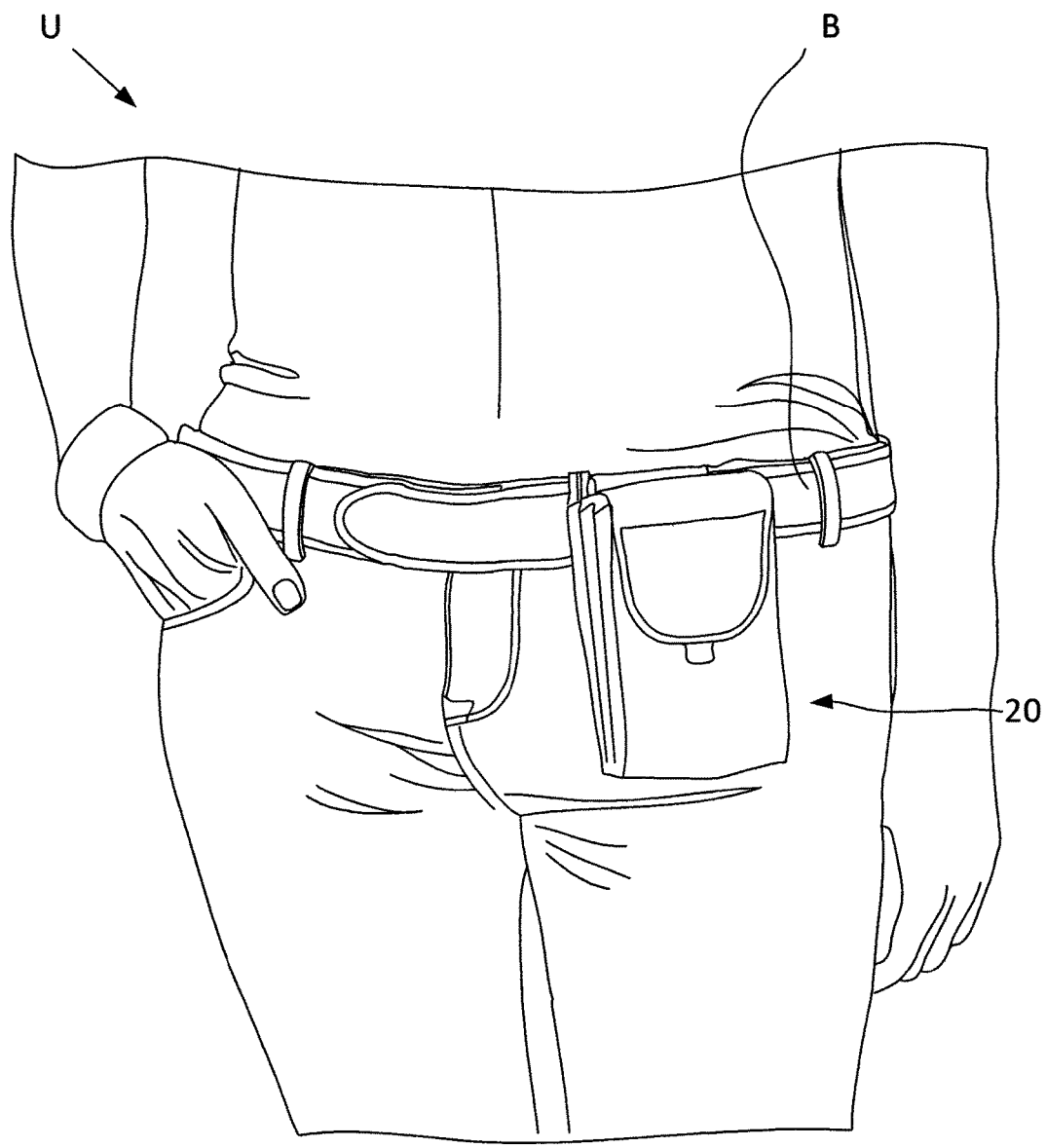
FIG. 1 is a general view of the body-wearable support of the invention, which enables a user a hands-free use of handheld electronic devices displaying visual information.

A general view of the body-wearable support 20 of the invention, which enables a user a hands-free use of handheld electronic devices displaying visual information (hereinafter referred to as a body-wearable support), is shown in FIG. 1 in its non-operative body-wearable condition. It can be seen that the body-wearable support of FIG. 1 can be conveniently secured on a belt B of a user U.

Figure 2:
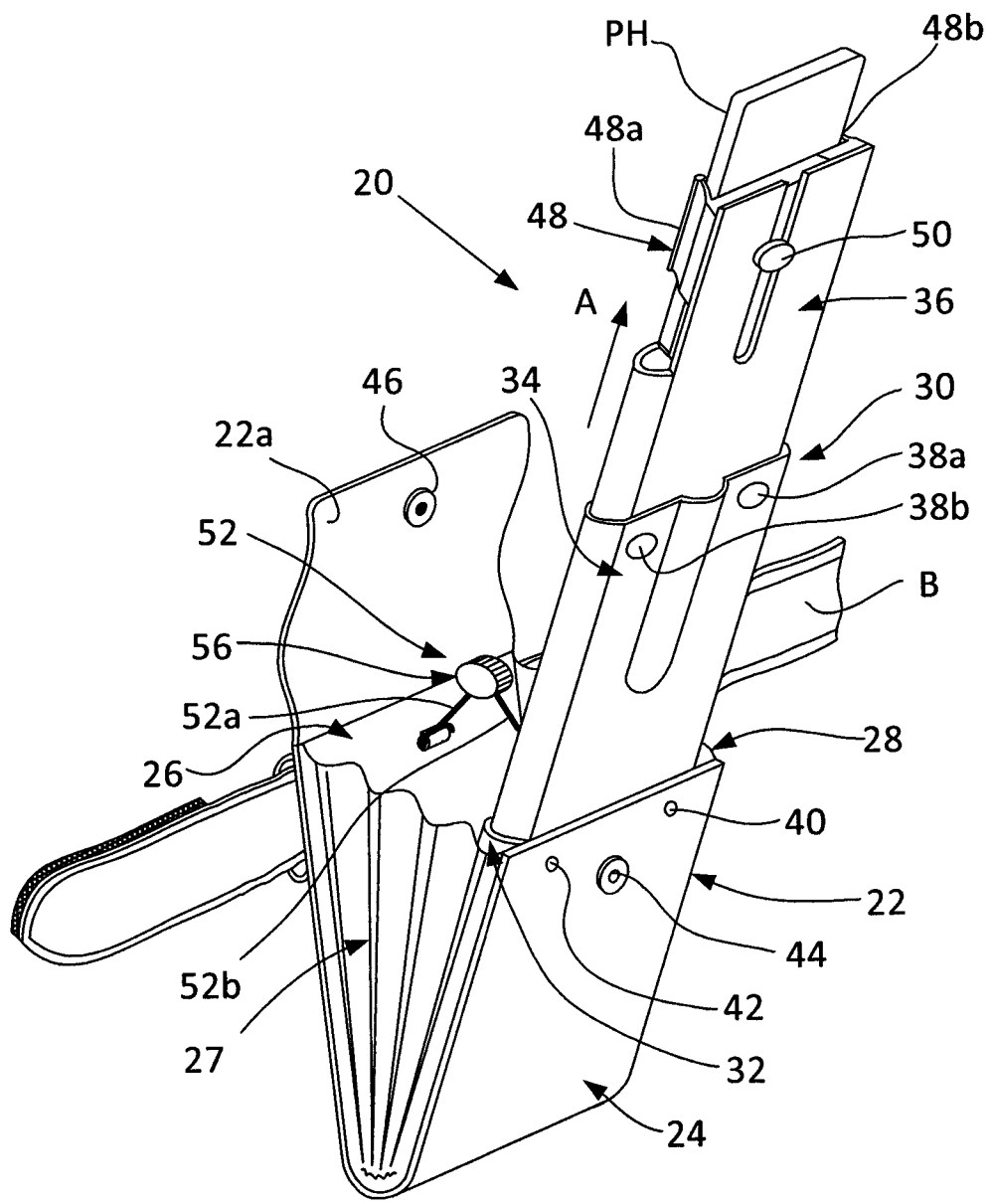
FIG. 2 is a three-dimensional view of the body-wearable support of the invention in its operative position with a smartphone arranged vertically.

FIG. 2 is a three-dimensional view of the body-wearable support 20 in its operative position. It can be seen that the support 20 consists of a case 22, e.g., a leather or molded-plastic case, having on its back side 26 a belt loop 23 (see FIG. 3 which is a rear view of the body-wearable support 20) for securing the case on the body of the user U with a conventional belt B.

The front side 24 of the case 22 is tiltable with respect to the back side 26, which is fixed relative to the user's body by the belt B. In order to make the front side 24 tiltable, the lateral sides 27 and 28 (FIG. 3) of the case 22 are made expandable and are made, e.g., in the form of bellows 27a and 28a. In an expanded state of the bellows-type lateral sides 27 and 28, the front side 24 assumes a tilted position with respect to the back side 26 forming a space between the back side and a front side. As can be seen from FIG. 2, said space has a triangular shape in a cross-section perpendicular to the plane of the back side.

The case 22 contains a telescopically extendable mechanism 30 formed by a plurality of members C-shaped in a cross section (hereinafter referred to as C-shaped members) telescopically inserted one into the other with a sliding fit. Although, only three such members are shown in FIG. 2, the number of the C-shaped members may be different, e.g., two or four. Taking into account the size of a standard smartphone and a vertical distance to the eyes of an average user, it was found rational to use three such C-shaped members, of which the outermost C-shaped member 32 is rigidly attached to the inner surface 24a of the front side 24 of the case 22, and other members 34 and 36 can be telescopically extended from the case 22 in the outward direction shown by arrow A (FIG. 2) and fixed in the extended position with respect to each other, e.g., by snapping locks 38a and 38b. Each snapping lock may be comprised, e.g., of a dimple on one telescopic member and a spherical projection on the mating telescopic member. Two snapping locks are shown only as an example and several such snaps can be used for adjusting the extension of the members in the vertical direction.

Figure 3:
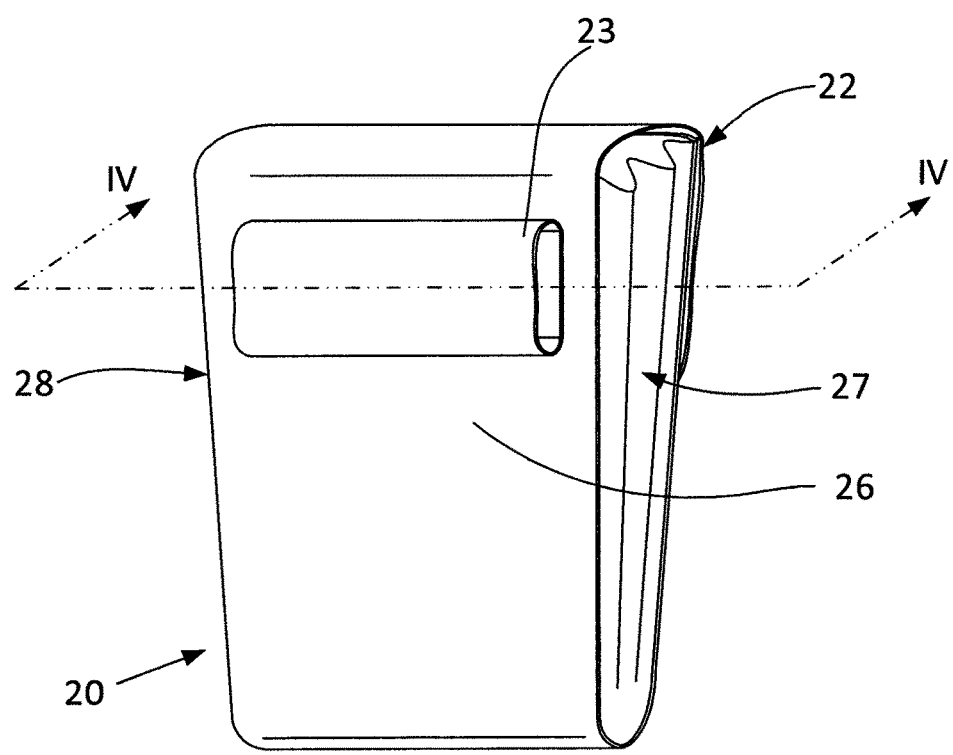
FIG. 3 is a rearview of the support of the invention shown a belt loop on the back side of the case.
Figure 4:
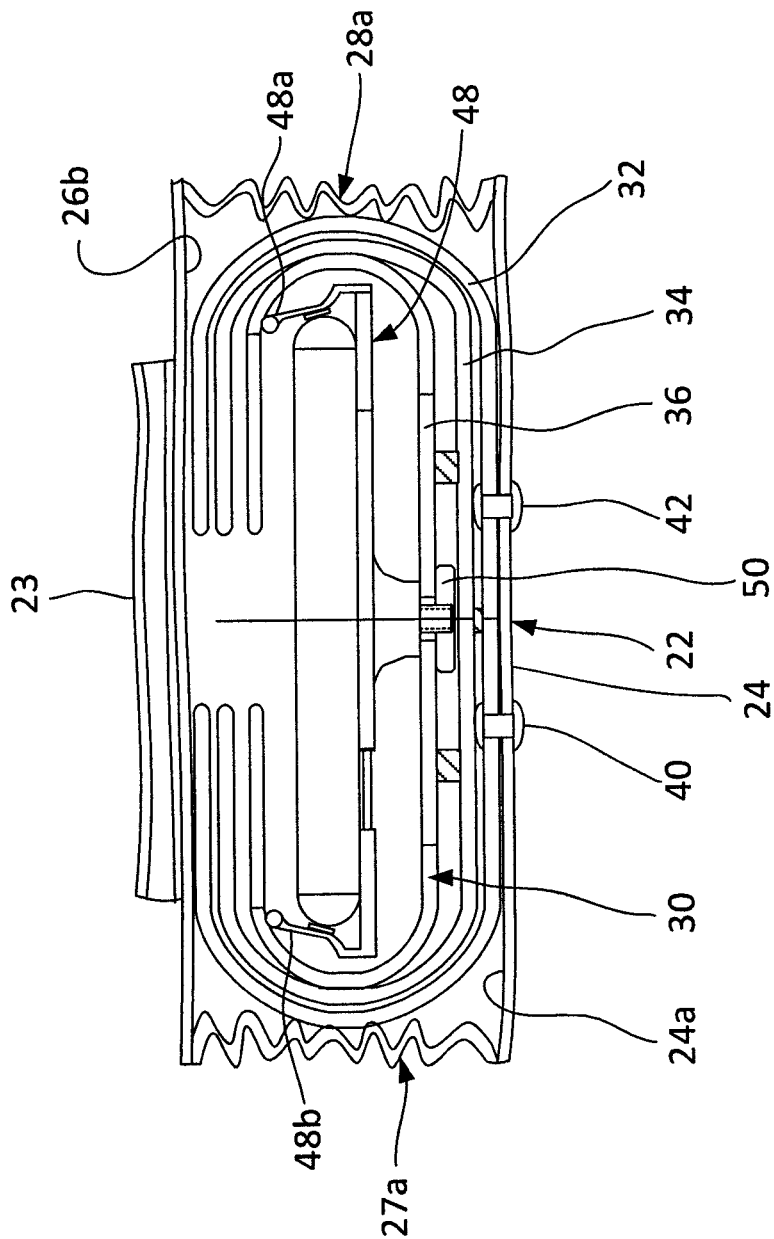
FIG. 4 is a sectional view along the line IV-IV of FIG. 3.

FIG. 4 is a sectional view through the case 22 along the line IV-IV of FIG. 3. It can be seen from this drawing that the outermost C-shaped member 32 is attached to the backside, e.g., by adhesive connection or by rivets 40 and 42.

References 44 and 46 show elements of a press-button for closing the case 22 with a flap 22a (FIG. 2).

Attached to the distant end of the innermost C-shaped member 36 is a clamping mechanism 48 for holding a handheld electronic device, e.g., a smartphone PH in a position facing the user with its screen. The phone PH or another appropriate object, e.g., a small tablet, can be fixed in the clamping mechanism 48 by resting on a flat shelf (not shown) perpendicular to the plane of the flat part of innermost C-shaped member 36. The phone PH is clamped with spring-loaded edges of two laterally slidable grippers 48a and 48b which can be fixed by a locking screw 50 in the object clamping position.

For interaction with a screw, a respective threaded opening (not shown) should be provided in the gripper. Alternatively, a short threaded stud may project from the backside of the gripper, and a locking knob with an inner thread can be used instead of the locking screw 50.

The clamping mechanism 48 for holding devices such as smart phones is known and may be similar to AIR55 Vent Car Mount for Smartphones available, e.g., through Amazon® (trademark of Amazon.com, Inc., Seattle, USA). In a modified form (without the rear adapter for attachment to the air vent of a vehicle), this device can be attached to the innermost C-shaped member 36 and fixed by the locking screw 50. Such a gripper device (AIR55 Vent Car Mount) is a 360-Degree Adjustable Mount and is fully adjustable with a 360-degree rotatable holster that twists and turns so you can view your device at your preferred angle—vertically or horizontally.

Figure 5:
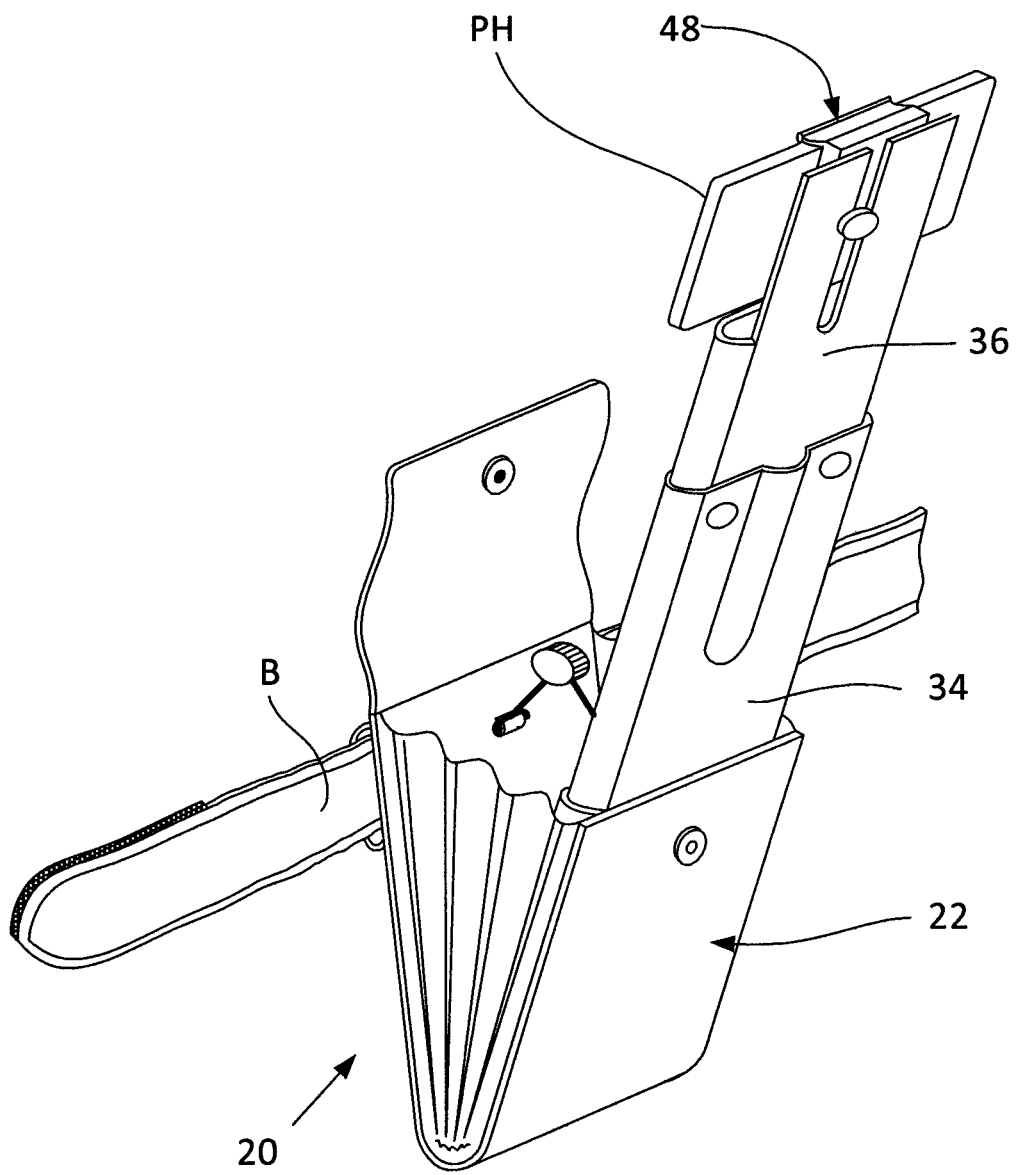
FIG. 5 is a view similar to FIG. 2 with a smartphone in a horizontal position.

The gripper device 48 allows effortlessly mounting and releasing the phone or tableting while the extendable spring holder maintains a secure grip and keeps the electronic device in place. Vena AIR55 holder is spring-loaded and stretches out to 85 mm when fully extended. It is designed with rubber grip. FIG. 2 shows an electronic device PH in a vertical position, and FIG. 5 shows the same device in a horizontal position.

Figure 6:
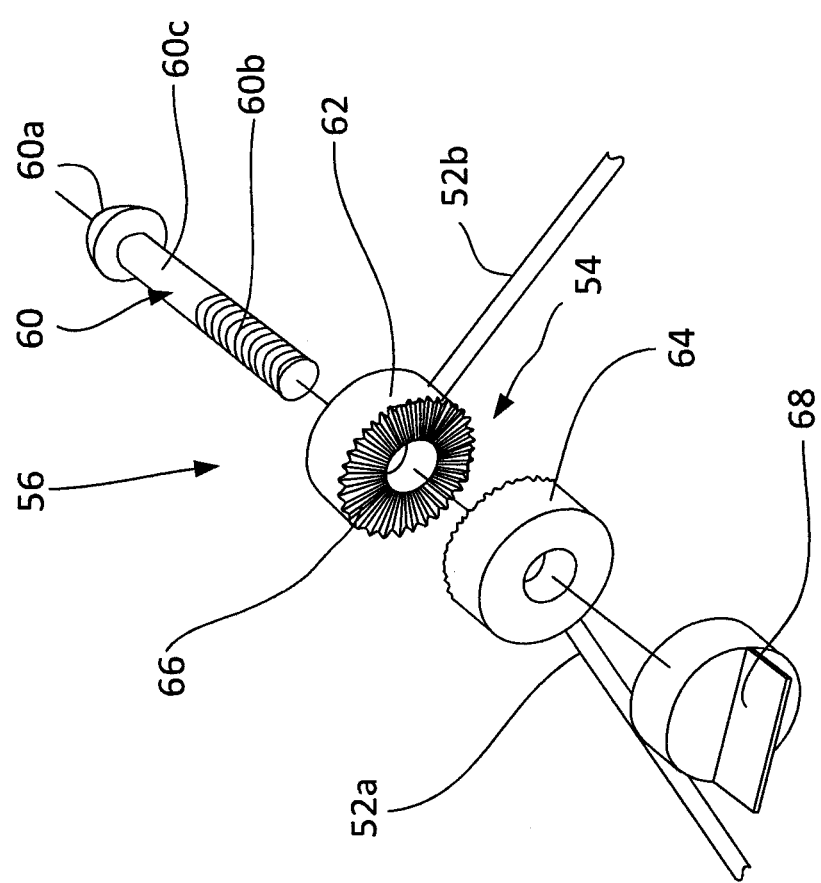
FIG. 6 is an extended three-dimensional view of a locking device for an intermediate pivot of the linkage mechanism lock.

In order to arranged the extended members of the telescopically extendable mechanism 30 in a titled position at an appropriate angle with respect to the back side 26 of the case 22, the belt-wearable support 20 of the invention is provided with an adjustable linkage mechanism 52. The linkage mechanism is located inside the case 22 and consists of one link 52a pivotally attached to the inner surface 26b (FIG. 4) of the back side 26 of the case and another link 52b pivotally attached to the inner surface 24a of the front side 24 of the case. The free ends of the links are connected to each other through an intermediate pivot 54. As a result, the tilt angle of the telescopic members can be changed by changing the angle between the both links. For fixing the telescopic members in a selected angular position, the intermediate pivot 54 is provided with a locking device 56. An example of an intermediate pivot 54 and its locking device 56 is shown in FIG. 6, which is an extended three-dimensional view of such a device. As can be seen from this drawing, the pivot and locking device assembly consists of a bolt 60 having a head 60a and a threaded portion 60b. A sleeve 62, which is rigidly connected with the link 52b, is fitted onto the non-threaded part 60c of the bolt 60, and a sleeve 64 is also fitted on the remaining non-threaded part 60c of the bolt 60. The facing sides of both sleeves have serrations, such as serrations 66 shown on the sleeve 62. Similar serrations (not seen) are provided on the facing side of the sleeve 64. Interactions of the serrations on both sleeves secure both sleeves 62, 64 and hence the links 52b, 52a in fixed position. In this position, the sleeves and thus the links 52a and 52b are locked by threading a knob 68 having an internal thread onto the threaded part 60b of the bolt 60 that projects outward from the sleeve 64.

For adjusting the angular position of the members of the telescopically extendable mechanism 30 with respect to the body of the user U, the knob 68 is slightly untwisted for releasing the sleeves. In the untwisted condition of the knob, the sleeves can be turned with respect to each other for tilting the members of the telescopically extendable mechanism 30 through the links 52a and 52b to an appropriate angle, and the positions of the sleeves, and hence of the electronic device PH held in the clamping mechanism 48, are fixed by tightening the knob on the threaded portion 60b.

The space inside the case 22 is sufficient for holding the entire telescopically extendable mechanism 30 in the folded state together with the handheld electronic device, e.g., a smart phone secured by the gripper.

For hands-free use of the belt-wearable support of the invention, the belt-wearable case 20 is opened. The front side 24 of the case 20 is tilted in a direction away from the user U, and the telescopic extendable mechanism 30 is extended outwards from the case 20, together with the electronic device, e.g., a smartphone PH secured at the distal end of the innermost telescopic member 36.

A position of the electronic device, e.g., of a smartphone PH, most convenient for individual requirements of the user U, is selected by extending the innermost telescopic member 36 to a required length and fixing the innermost member by the appropriate snapping locks 38a, 38b. Then, the angular position of the electronic device PH with respect to the body of the user U is adjusted by using the linkage mechanism 52 with subsequent fixation of the adjusted angular position with the linkage locking device.

Figure 7:
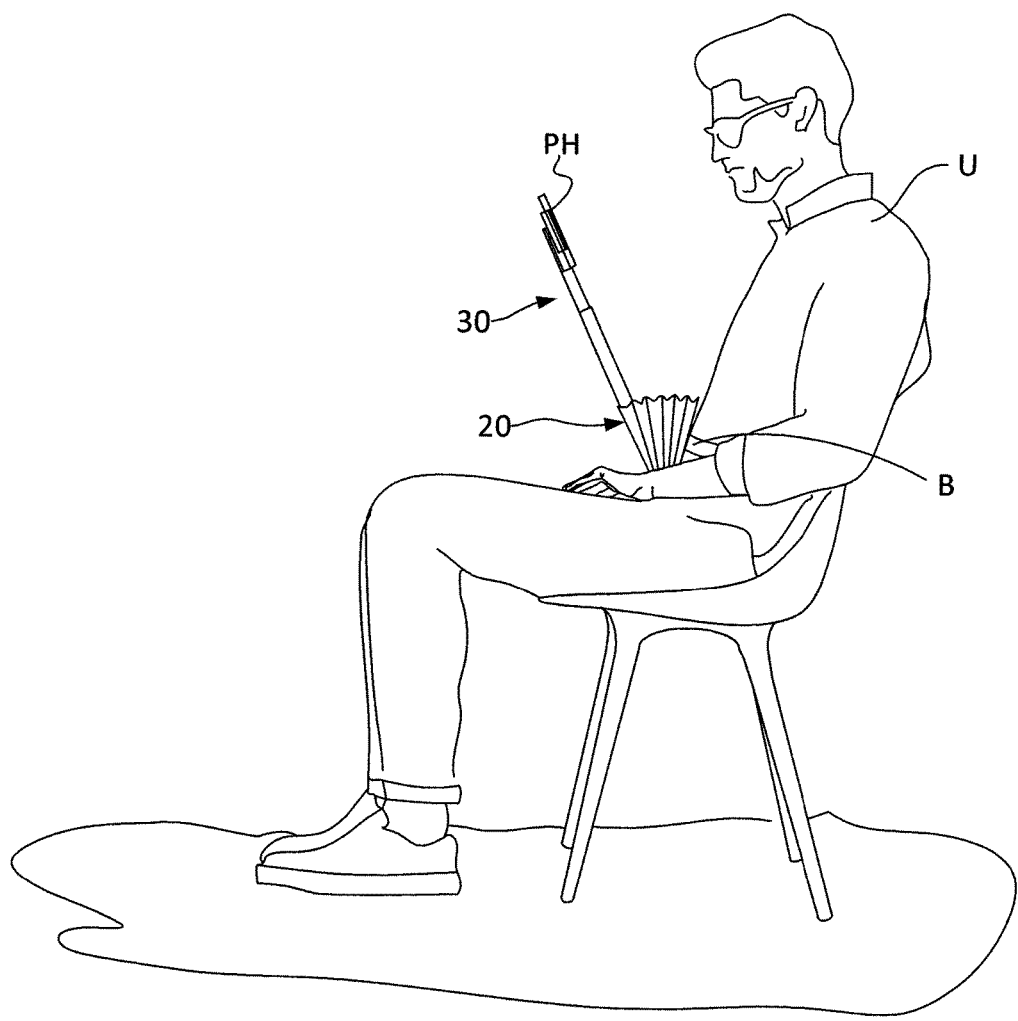
FIG. 7 is a view of a user who uses the support of the invention in a sitting position.

Now the belt-wearable support 20 of the invention can be used without participation of the user's hands while the user is in a sitting (FIG. 7), standing or walking condition.

Thus, it has been shown that the present invention provides a body-wearable support, which enables a user a hands-free use of handheld electronic devices displaying visual information, in particular such devices as smart phones, "phablets", small tablets, or similar devices. The support allows a user to view the screens of cell phones or small tablets in a hands-free manner and at a distance most convenient for the clear viewing, while the user is sitting, standing, or walking. An advantage of the support of the invention over the known prior art devices, such as flexible rods with shape memory, consists of the fact that the support of the invention is a self-contained device, which, due to its collapsibility, can be reduced in size to dimensions suitable for placement into a belt-wearable case together with the smartphone or another small electronic device. On the contrary, the flexible rod with memory, which is now in the market, demands the use of a separate bag or another container as it cannot be folded to the size comparable with the support of the invention.

Although the invention has been described and shown with reference to specific drawings, it is understood that this description and these drawings should not be construed as limiting the scope of the invention and that any changes and modifications which do not go beyond the scope of the attached claims are possible. For example, the case may be made from leather, plastic, or fabric. The members of the telescopically extendable mechanism may have a rectangular cross section. They can be fixed in the extended state by, e.g., by spring-loaded balls engaging the recesses, the linkage mechanism for adjusting the tilt angle of the members can be different from one shown in FIG. 6. The belt used for attachment of the case to the user's body may be of any type suitable for men or women.

The invention claimed is:

1. A belt-wearable support for hands-free use of handheld electronic devices comprising:
    a case having a back side and a front side tiltable forward from the back side into a tilted position, and a space formed between the back side and the front side;
    a telescopically extendable mechanism, which is located in said space and comprises at least two members which may assume a folded position completely inside of the case or a telescopically extendable position in which one of the members is secured inside of the case and attached to the front side and another member is moved outward from said space;
    an adjustable linkage mechanism for moving the front side to the tilted position with respect to the back side;
    a holder for a handheld electronic device formed on said another member for holding the handheld electronic device at a proper distance from a device user's eyes when the telescopically extendable mechanism is in the telescopically extended position and said another member is tilted to a proper angle; and
    a belt loop on the back side of the case for securing the case on the body of the user with the use of a belt, wherein the case has two expandable bellows-type lateral sides between the front side and the back side, and wherein in an expanded state of the bellows-type lateral sides, the front side assumes a tilted position with respect to the back side forming said space between the back side and a front side, said space having a triangular shape in a cross-section perpendicular to the back side, the front side having a front inner surface, the back side having a back inner surface, and the space formed between the back side and the front side being sufficient to receive the telescopically extendable mechanism in said folded position thereof together with the handheld electronic device secured in the holder.

2. The belt-wearable support according to claim 1, wherein the members of the telescopically extendable mechanism are C-shaped in a cross section and are inserted into each other with a sliding fit.

3. The belt-wearable support according to claim 2, wherein the holder for a handheld electronic device has spring loaded edges for gripping a handheld electronic device and has a turnable 360-degree adjustable mount.

4. The belt-wearable support according to claim 1, wherein the adjustable linkage mechanism for moving the front side to the tilted position with respect to the back side is located in said space and has one link pivotally attached to the back side of the case and another link pivotally attached to the front side of the case, an intermediate pivot between the first link and the second link to which the first link and the second link are pivotally connected, and a locking mechanism for locking the intermediate pivot in the tilted position of the front side so that when the second link is turned relative to the back side to form a predetermined angle between the back side and the front side, said another member, when moved outward from said space, is fixed at said predetermined angle relative to the back side of the case.

5. The belt-wearable support according to claim 4, wherein the intermediate pivot comprises: a bolt with a non-threaded part and a threaded part, the first link having a first sleeve fitted on the non-threaded part, the second link having a second sleeve fitted on the non-threaded part; and a knob with an internal thread screwed onto the threaded part of the bolt for releasing the sleeves in an unscrewed state and for fixing the sleeves with respect to each other when it is tightened on the threaded part of the bolt.

6. The belt-wearable support according to claim 5, wherein the locking mechanism for locking the intermediate pivot comprises serrations formed on the facing sides of the first sleeve and the second sleeve.

7. The belt-wearable support according to claim 1, wherein the telescopically extendable mechanism comprises three members which may assume a folded position completely inside of the case or a telescopically extendable position in which one of the members is secured inside of the case and attached to the front side and two other members are moved outward from said space.

8. The belt-wearable support according to claim 3, wherein the adjustable linkage mechanism for moving the front side to the tilted position with respect to the back side is located in said space and has one link pivotally attached to the back side of the case and another link pivotally attached to the front side of the case, an intermediate pivot between the first link and the second link to which the first link and the second link, are pivotally connected, and a locking mechanism for locking the intermediate pivot in the tilted position of the front side so that when the second link is turned relative to the back side to form a predetermined angle between the back side and the front side, said another member, when moved outward from said space, is fixed at said predetermined angle relative to the back side of the case.

9. The belt-wearable support according to claim 8, wherein the intermediate pivot comprises a bolt with a non-threaded part and a threaded part, the first link has a first sleeve fitted on the non-threaded part, the second link has a second sleeve fitted on the non-threaded part, and a knob with an internal thread screwed onto the threaded part of the bolt for releasing the sleeves in an unscrewed state and for fixing the sleeves with respect to each other when it is tightened on the threaded part of the bolt.

\* \* \* \* \*